G. S. WELCH.
OVEN.
APPLICATION FILED FEB. 2, 1914.

1,124,085.

Patented Jan. 5, 1915.

Witnesses
Inventor
George S. Welch

UNITED STATES PATENT OFFICE.

GEORGE S. WELCH, OF CHICAGO, ILLINOIS.

OVEN.

1,124,085.

Specification of Letters Patent.

Patented Jan. 5, 1915.

Application filed February 2, 1914. Serial No. 815,997.

*To all whom it may concern:*

Be it known that I, GEORGE S. WELCH, a citizen of the United States, residing at Chicago, in the county of Cook and State of Illinois, have invented a certain new and useful Improvement in Ovens, of which the following is a full, clear, concise, and exact description, reference being had to the accompanying drawings, forming a part of this specification.

My invention relates to ovens and has for its object the provision of an improved oven structure which with great facility may be used for cooking purposes by means of heat confined within the oven structure after such heat has been originally supplied to the oven and the further supply of heat discontinued.

In a preferred form of my invention, generally speaking, I have an oven structure to which heat is supplied through the agency of a suitable gas burner, whereafter the oven having been sufficiently heated, the burner is discontinued and the openings in the oven closed, whereby the heat contained within the oven will then continue the cooking operation, thus effecting a great saving in gas.

The improved oven of my invention has, of course, suitable heat insulating walls so as to retain the heat therein.

Figure 1:
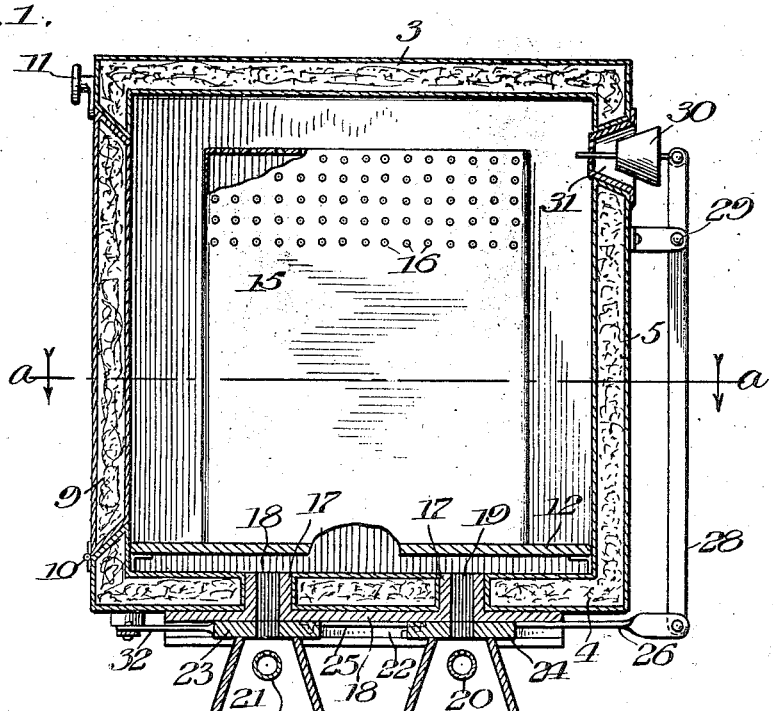
Figure 2:
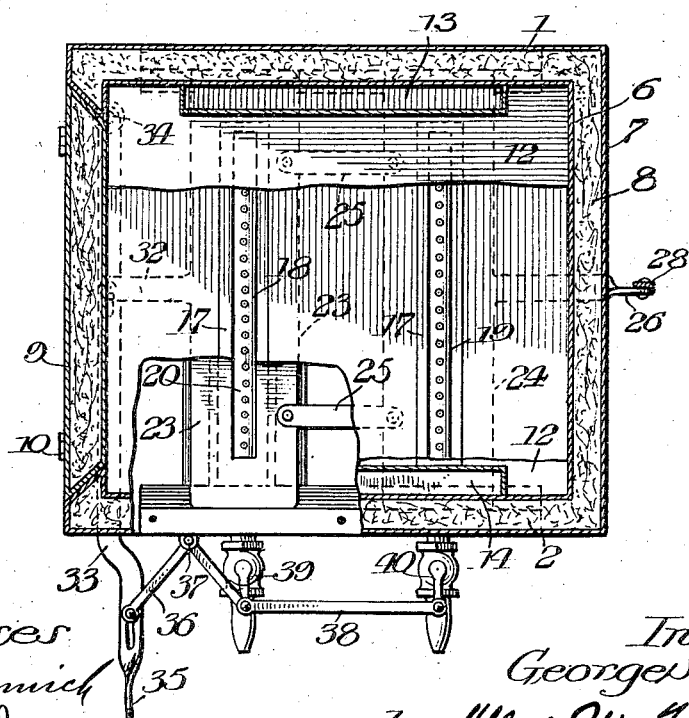

My invention concerns itself with improvements in ovens of this general character, and I will explain one form which my invention may take by reference to the accompanying drawing in which:

Figure 1 is a vertical sectional view of a heater constructed in accordance with my invention; and Fig. 2 is a sectional view on line *a—a* of Fig. 1, portions being broken away more clearly to reveal features of construction.

My improved oven structure has the two side walls 1 and 2, the top wall 3, bottom wall 4 and end wall 5, all constructed of two layers of sheet iron 6 and 7, with heat insulating material 8 between them. A heat insulating door 9 is mounted at the front of the oven, being adapted to swing about the hinges 10, and being held in place by the lock 11. Interiorly of the oven, I provide a false bottom 12 extending clear across the lower portion of the oven with the exception of the open spaces 13 and 14 shown more clearly in Fig. 2 which form the inlet to a conducting channel 15 leading toward the top of the oven and provided with holes 16, 16. The heat enters between the false bottom 12 and the bottom wall 4 and passes upwardly through the apertures 13 and 14 into the channels 15, to be from there conducted into the interior of the oven through the apertures 16. Heat is also supplied to the interior of the oven by conduction through the plate 12 forming the false bottom. The bottom wall 4 is perforated to accommodate upwardly extending walls 17 of a channel forming part of a casing 18 secured to the said bottom wall. The walls 17 form the ducts 19 through which heat is supplied to the interior of the oven from the burners 20, 20. These burners are mounted within hoods 21, 21, so that all of the heat provided by the burners is led upwardly by the ducts 18 and 19, into the oven. The channel 18 is also recessed to provide guides 22 within which a sliding element consisting of the valve 23 and the valve 24 may slide, said valves being united by the members 25. The slide 23 is connected at its rear portion through the agency of the arm 26 to a lever 28 pivoted at 29 and pivoted to a vent closure or valve 30 adapted to close or open the vent 31. The forward extremity of the slide is connected by means of the arm 32 with another lever 33 pivoted at 34 so that when this lever is swung about its pivot, the valves may either open or close the ducts 18 and 19 as may be desired. Whenever the ducts 18 and 19 are open, the vent 31 is also open and whenever the ducts 18 and 19 are closed the vent 31 is closed. The lever 33 through the agency of its hand hold 35 also operates a bell crank lever 36 pivoted at 37, which bell crank lever through the agency of the extension rod 38 controls both gas inlet valves 39 and 40 leading respectively to the burners 20, 20. Whenever the ducts 18 and 19 are open the supply of gas is admitted to the burners and whenever the ducts 18 and 19 are closed the valves 39 and 40 are also simultaneously closed. It will be seen from this that the supply of heat is efficiently conducted to the oven from the burners 20, the hoods 21 forming sufficient passageway for the air to the burners. The false bottom 12 also prevents drippings from the food within the oven from falling into the ducts 18 and 19. The heat supplied by the burners is in part conducted to the interior of the oven from the plate 12 and in part is directed to the top of the oven through the duct 15. The valves 23 and 24 and the valve 30 when closed serve to confine the heat within the oven.

From what has been described it is thought the nature of my invention will be entirely clear and readily apparent to those skilled in the art.

Having however thus described one form which my invention may take, what I claim as new and desire to secure by Letters Patent is:

1. An oven having heat insulating walls, a pair of parallel ducts leading through the bottom wall and extending substantially the entire width of said wall, a hood under each duct, a pair of pipes for supplying the gas arranged within and running longitudinally of said ducts, a pair of sliding closures for said ducts fastening together, valves to govern the supply of gas to said pipes, and means to move said closures and to control said valves.

2. An oven having heat insulating walls, a pair of parallel ducts leading through the bottom wall and extending substantially the entire width of said wall, a hood under each duct, a pair of pipes for supplying the gas arranged within and running longitudinally of said ducts, a pair of sliding closures for said ducts fastened together, valves to govern the supply of gas to said pipes, a vent in the top portion of the rear wall of said oven, and means to move said closures and to control said valves and the closure of said vent.

3. An oven having heat insulating walls, a pair of parallel ducts leading through the bottom wall and extending substantially the entire width of said wall, a hood under each duct, a pair of pipes for supplying the gas arranged within and running longitudinally of said ducts, a pair of sliding closures for said ducts fastened together, valves to govern the supply of gas to said pipes, a vent in the top portion of the rear wall of said oven, a heat conducting false bottom within said oven, and means to move said closures and to control said valves and the closure of said vent.

4. An oven having heat insulating walls, a pair of parallel ducts leading through the bottom wall and extending substantially the entire width of said wall, a hood under each duct, a pair of pipes for supplying the gas arranged within and running longitudinally of said ducts, a pair of sliding closures for said ducts fastened together, valves to govern the supply of gas to said pipes, a vent in the top portion of the rear wall of said oven, a heat conducting false bottom within said oven, ducts leading from the space below said false bottom toward the upper portion of said oven, having openings in the upper portion thereof communicating with the interior of the oven, and means to move said closures and to control said valves and the closure of said vent.

5. An oven having heat insulating walls, a pair of parallel ducts leading through the bottom wall and extending substantially the entire width of said wall, a hood under each duct, a pair of pipes for supplying the gas arranged within and running longitudinally of said ducts, a pair of sliding closures for said ducts fastened together, valves to govern the supply of gas to said pipes, a vent in the top portion of the rear wall of said oven, a heat conducting false bottom within said oven, ducts leading from the space below said false bottom toward the upper portion of said oven, having opening in the the upper portion thereof communicating with the interior of the oven, said ducts being arranged along the side walls of said oven and extending throughout substantially the entire length of said walls.

In witness whereof, I hereunto subscribe my name this 17th day of January, A. D., 1914.

GEORGE S. WELCH.

Witnesses:
A. L. JONES,
HAZEL ANN JONES.